W. S. KIMBALL.
WINE PRESS.
No. 29,889. Patented Sept. 4, 1860.
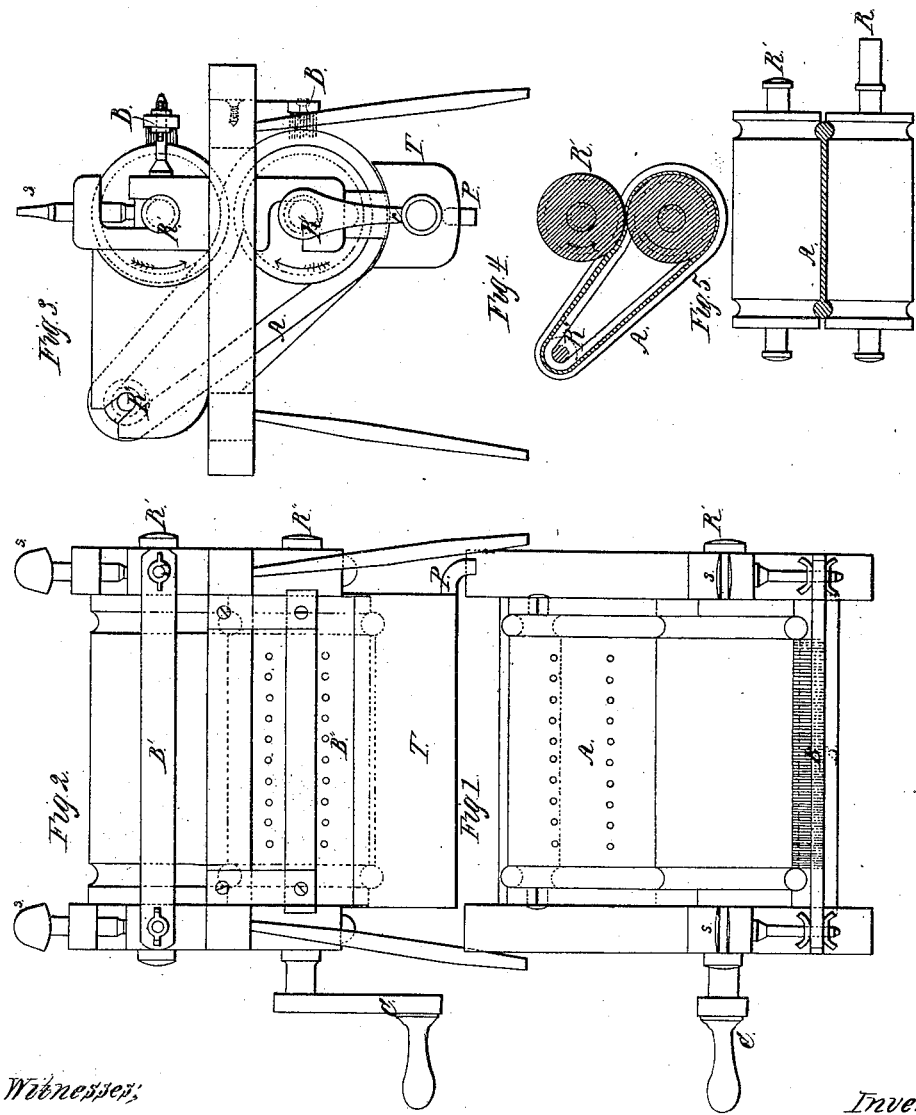

UNITED STATES PATENT OFFICE.

WM. S. KIMBALL, OF ROCHESTER, NEW YORK.

WINE-PRESS.

Specification of Letters Patent No. 29,889, dated September 4, 1860.

*To all whom it may concern:*

Be it known that I, W. S. KIMBALL, of the city of Rochester, in the county of Monroe and State of New York, have invented certain new and useful Improvements in the Construction of Machines for Expressing the Juice from Grapes and other Fruit; and I do hereby declare the following to be a full and accurate description of the same, reference being had to the accompanying drawings, making part of this specification, and to the letters of reference marked thereon, same letters referring to like parts in all the figures.

Of said drawings Figure 1 is a plan of my improved press. Fig. 2 is a front elevation. Fig. 3 is a side elevation. Fig. 5 is an elevation of the rollers and section of the apron. Fig. 4 is a section of the rollers and apron at right angles to Fig. 5.

The nature of this invention consists in passing the fruit between two rollers by means of a perforated and elastic or compressible apron—the distance of the rollers apart and the compressibility of the apron being so adjusted that while all the juice of the fruit will be expressed and forced through the perforations in the apron none of the seeds or stems will be crushed or expressed—they being much firmer and harder than the fruit.

The construction of the machine will be readily understood from an inspection of the drawings where it will be seen that the rollers R′ R″ R‴ are arranged in a stout frame so as to be easily turned by means of the crank handle C. A perforated belt or apron passes between the rollers R′ R″ and over the roller R‴, and this belt or apron is provided with enlarged or corded edges as seen in Fig. 5, these edges running in corresponding grooves formed in the rollers R′ R″ as there shown. Without this device it is found to be impossible to maintain the apron in place as owing to the unequal expansion produced by variations in the thickness of different parts of the layer of fruit the belt will inevitably run to one side and either run into a cord or run off— no matter how much the rollers may be bulged according to the usual plan for keeping belts on rollers or pulleys. But if a good-sized and firm cord be attached to the edge of the belt so as to run in the grooves in the rollers the belt or apron is effectually kept in place and cannot move sidewise in the least degree.

The fruit being deposited upon the apron and the rollers set in motion the fruit is crushed and the juice expressed, the latter passing through the perforations in the apron on to the strainer T whence it descends by the spout P into any convenient vessel. The brush B′ cleanses the upper roller of all adherent skins and seeds which fall on to the apron, whence they are removed by the lower brush B″ and fall into any convenient receptacle.

A wine press constructed as herein described possesses numerous and important advantages. For not only does it express all the juice of the fruit without bruising the seeds and stems and expressing their juice and thus giving a harsh flavor to the wine; it is so easily kept clean from there being no joints, &c., in the working parts that the wine may always be kept pure and sweet and with little tendency to run into the putrid or acetous fermentation. It was found however that when the rollers were covered with the elastic coating there would always be more or less crevices between the wood and the rubber and as it was impossible to keep them clean the wine was materially injured.

Having thus described my invention what I claim therein as new and desire to secure by Letters Patent is—

1. The use of the perforated, elastic apron A in combination with the rollers R′ R″ R‴ in the manner and for the purpose substantially as described.

2. The use of the corded or enlarged edges of the apron A in combination with the grooved rollers as shown in Fig. 4 the whole being arranged and operating in the manner and for the purpose substantially as set forth.

WM. S. KIMBALL.

Witnesses:
 JOHN PLIM,
 MARION E. KIMBALL.